United States Patent
Loelsberg et al.

(10) Patent No.: US 12,202,242 B2
(45) Date of Patent: Jan. 21, 2025

(54) THERMAL INSULATION BOARD COMPRISING AT LEAST ONE AEROGEL COMPOSITE MATERIAL FOR THE THERMAL INSULATION OF BUILDINGS

(71) Applicant: ASPEN AEROGELS, INC., Northborough, MA (US)

(72) Inventors: Wibke Loelsberg, Ludwigshafen (DE); Arne Klinkebiel, Lemfoerde (DE); Eva Guenther, Trostberg (DE); Christian Schmidt, Ludwigshafen (DE); David J. Mihalcik, Northborough, MA (US); Kathryn Elizabeth Dekrafft, Northborough, MA (US); Nicholas Zafiropoulos, Northborough, MA (US); Owen Richards Evans, Northborough, MA (US); George L. Gould, Northborough, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 53 days.

(21) Appl. No.: 17/779,075

(22) PCT Filed: Nov. 5, 2020

(86) PCT No.: PCT/EP2020/081123
§ 371 (c)(1),
(2) Date: May 23, 2022

(87) PCT Pub. No.: WO2021/099130
PCT Pub. Date: May 27, 2021

(65) Prior Publication Data
US 2023/0020788 A1  Jan. 19, 2023

(30) Foreign Application Priority Data
Nov. 22, 2019  (EP) .................................... 19211015

(51) Int. Cl.
*B32B 5/18* (2006.01)
*B32B 7/12* (2006.01)
*B32B 13/04* (2006.01)

(52) U.S. Cl.
CPC .................. *B32B 5/18* (2013.01); *B32B 7/12* (2013.01); *B32B 13/045* (2013.01);
(Continued)

(58) Field of Classification Search
CPC ....... B32B 13/02; B32B 13/045; B32B 13/14; B32B 2250/22; B32B 2255/00;
(Continued)

(56) References Cited

U.S. PATENT DOCUMENTS 5,124,364 A     6/1992  Wolff et al.
5,569,513 A  *  10/1996 Fidler .................... C08J 9/0066
                                                   428/36.5
(Continued)

FOREIGN PATENT DOCUMENTS

CN  103237838 A  *  8/2013  ............... C08J 9/00
CN  106832635 A     6/2017
(Continued)

OTHER PUBLICATIONS

Translation of CN103237838A, Hahn et al., Aug. 7, 2013. (Year: 2013).*
(Continued)

*Primary Examiner* — Hai Vo
(74) *Attorney, Agent, or Firm* — Schwegman Lundberg & Woessner, P.A.

(57) ABSTRACT

The present invention relates to a thermal insulation board (IB) comprising at least two insulating layers (A) bonded together. At least one of the at least two insulating layers (A) comprises at least one aerogel composite material, wherein the aerogel composite material comprises at least one silica
(Continued)

aerogel (a1), at least one polymer foam (a2) and at least one flame retardant (a3). The present invention also relates to a thermal insulation system (IS) comprising the thermal insulation board (IB). Further, it relates to a process for the production of the thermal insulation board (IB) and to the use of the thermal insulation board (IB) and of the thermal insulation system (IS) for the thermal insulation of buildings, parts and/or elements of buildings.

14 Claims, 2 Drawing Sheets

(52) U.S. Cl.
 CPC ... *B32B 2305/022* (2013.01); *B32B 2307/304* (2013.01); *B32B 2307/3065* (2013.01); *B32B 2307/41* (2013.01); *B32B 2307/732* (2013.01)

(58) Field of Classification Search
 CPC ........ B32B 2260/021; B32B 2260/044; B32B 2264/10; B32B 2264/101; B32B 2266/0278; B32B 2266/0285; B32B 2266/06; B32B 2266/126; B32B 2266/128; B32B 2305/022; B32B 2307/304; B32B 2307/3065; B32B 2307/402; B32B 2307/41; B32B 2307/732; B32B 2419/00; B32B 5/022; B32B 5/024; B32B 5/028; B32B 5/18; B32B 5/245; B32B 5/32; B32B 7/08; B32B 7/12; Y02A 30/24; Y02B 80/10; Y02E 60/10

See application file for complete search history.

(56) References Cited

U.S. PATENT DOCUMENTS

| | | | | |
|---|---|---|---|---|
| 2014/0318069 | A1* | 10/2014 | Moennig | E04F 13/0885 52/506.01 |
| 2016/0096949 | A1* | 4/2016 | Evans | C08K 3/34 521/122 |
| 2016/0115685 | A1* | 4/2016 | Bonnardel | E04B 1/80 252/62 |
| 2017/0210108 | A1 | 7/2017 | Mihalcik et al. | |
| 2018/0312407 | A1* | 11/2018 | Oh | D06M 11/45 |
| 2018/0370211 | A1 | 12/2018 | Gupta et al. | |

FOREIGN PATENT DOCUMENTS

| | | | |
|---|---|---|---|
| CN | 108602307 | A | 9/2018 |
| CN | 115397662 | A | 11/2022 |
| CN | 115397662 | | 12/2023 |
| CN | 117569467 | | 2/2024 |
| EP | 2665876 | B1 | 3/2015 |
| EP | 2347059 | B1 | 5/2017 |
| EP | 4061632 | A1 | 9/2022 |
| HK | 40075225 | A | 1/2023 |
| JP | H01299840 | A | 12/1989 |
| KR | 20220133862 | A | 10/2022 |
| WO | WO-2021099130 | A1 | 5/2021 |

OTHER PUBLICATIONS

"Chinese Application Serial No. 202080094392.6, Office Action mailed Apr. 21, 2023", with English claims, 19 pgs.
"Database WPI. Week 201757", Thomson Scientific, London, GB; AN 2017-42639S, (Jun. 13, 2017), 3 pgs.
"European Application Serial No. 20799743.8, Response to Communication pursuant to Rules 161(1) and 162 EPC filed Dec. 22, 2022", 11 pgs.
"European Application Serial No. 23168542.1, Extended European Search Report mailed Jun. 30, 2023", 8 pgs.
"International Application Serial No. PCT/EP2020/081123, International Preliminary Report on Patentability mailed Jun. 2, 2022", 7 pgs.
"International Application Serial No. PCT/EP2020/081123, Written Opinion mailed Dec. 8, 2020", 5 pgs.
"Mexican Application Serial No. MX/a/2022/006158, Office Action mailed Jun. 6, 2022", with machine translation, 6 pgs.
"Mexican Application Serial No. MX/a/2022/006158, Office Action mailed Jul. 15, 2022", with machine translation, 4 pgs.
"Mexican Application Serial No. MX/a/2022/006158, Response filed Jul. 12, 2022 to Office Action mailed Jun. 6, 2022", with machine translation, 4 pgs.
International Search Report issued in connection with PCT Application No. PCT/EP2020/081123 dated Dec. 8, 2020.
"Japanese Application Serial No. 2022-529842, Office Action mailed Dec. 12, 2023", with machine translation, 4 pgs.
"Application Serial No. 23168542.1, Response filed Nov. 9, 2023 to Communication Pursuant to EPC Rule 69 mailed Aug. 7, 2023", 6 pgs.
"European Application Serial No. 23168542.1, Communication Pursuant to Article 94(3) EPC mailed Feb. 16, 2024", 3 pgs.
"European Application Serial No. 23168542.1, Response filed Apr. 26, 2024 to Communication Pursuant to Article 94(3) dated Feb. 16, 2024", 21 pgs.

* cited by examiner

Fig. 1

Fig. 2

THERMAL INSULATION BOARD COMPRISING AT LEAST ONE AEROGEL COMPOSITE MATERIAL FOR THE THERMAL INSULATION OF BUILDINGS

CROSS-REFERENCE TO RELATED APPLICATIONS

This is a 35 U.S.C. 371 National Stage Patent Application which claims priority to International Application No. PCT/EP2020/081123, filed Nov. 5, 2020, which claims priority to European Application No. 19211015.3, filed Nov. 22, 2019, each of which is hereby incorporated by reference in its entirety.

The present invention relates to a thermal insulation board (IB) comprising at least two insulating layers (A) bonded together. At least one of the at least two insulating layers (A) comprises at least one aerogel composite material, wherein the aerogel composite material comprises at least one silica aerogel (a1), at least one polymer foam (a2) and at least one flame retardant (a3). The present invention also relates to a thermal insulation system (IS) comprising the thermal insulation board (IB). Further, it relates to a process for the production of the thermal insulation board (IB) and to the use of the thermal insulation board (IB) and of the thermal insulation system (IS) for the thermal insulation of buildings, parts and/or elements of buildings.

Energy conservation, particularly with thermal insulation, is an important issue in industry and building construction. Traditional thermal insulation materials are, for example, glass wool, mineral wool, extruded polystyrene and expanded polystyrene. The thermal insulation performance of the insulation materials is measured by their thermal conductivity. The lower the value of the thermal conductivity, the less the insulation material conducts heat and the better the thermal insulation is.

Aerogels are widely considered to be among the best solid thermal insulation materials available as they generally have a thermal conductivity λ of ≤20 W/(mK). However, as they are typically obtained in granular form, which poses problems in transportation and handling, aerogels are typically glued together by a binder to obtain a single block piece, preferably a panel, or are imbedded in mechanically stable substrates or carrier materials such as glass fibre mats. However, by these measures, there are some further drawbacks: The overall weight and thickness of the thermal insulation material is increased and it tends to exhibit dust on handling, machining and installing. Further, in case of binding granulates together, the thermal insulation material also tends to be mechanically fragile. Therefore, in order to avoid such undesired increase in weight and thickness and to reduce dustiness, open-cell polymer foams are recently used as carrier materials. By incorporating the aerogel in an open-cell polymer foam, an insulating layer comprising the aerogel and the open-cell polymer foam is obtained.

The obtained insulating layer is typically bonded to at least one further insulating layer to form a multi-layer thermal insulation board, wherein the further insulating layer may also comprise an aerogel. The formed multi-layer thermal insulation board can be bonded to at least one further layer which is not an insulating layer to form a thermal insulation system. Examples for further layers are, for example, layers comprising adhesives, mortars, reinforcing materials, paints, coatings and plasters.

The thermal insulation systems are, for example, used in multi-layered external thermal insulation composite systems (ETICS), multi-layered exterior insulation façade systems (EIFS) and interior insulation systems.

US 2016/0115685 discloses a multi-layer panel comprising at least one layer consisting essentially of an insulating composite material, wherein the insulating composite material comprises an inorganic aerogel and a melamine foam. For example, one or more plasterboards can be bonded to one or each side of the layer consisting essentially of the insulating composite material.

EP 2 347 059 B1 discloses an insulated building wall comprising an external thermal insulation composite system (ETICS) and a building wall, wherein the external thermal insulation composite system is affixed to the building wall. The external thermal insulation composite system comprises an insulation sub-system which is either an insulation sub-system comprising at least a first insulating plate which contains 20 to 90% by weight of an aerogel and at least a second insulating plate which contains mineral wool, or an insulation sub-system comprising at least one composite insulating plate containing mineral wool and 20 to 90% by weight of an aerogel. The external thermal insulation composite system also comprises at least one mechanical fastener and an outer layer which is a system comprising a mortar layer.

EP 2 665 876 B1 describes an insulated building wall comprising a composite thermal insulation system and an external building wall, wherein the composite thermal insulation system is affixed to the side of the building wall facing away from the building, the composite thermal insulation system comprising an at least two-layer thermal insulation cladding, with at least two layers each containing from 25 to 95% by weight of aerogel, from 5 to 75% by weight of inorganic fibres and from 0 to 70% by weight of inorganic fillers. The layers of the thermal insulation cladding are joined together by means of an inorganic binder. The aerogel is at least one aerogel based on silicon, aluminium and/or titanium.

US 2018/0112134 A1 discloses a fireproof material which incorporates a silica aerogel with an organic foam material. The organic foam material is one or a combination of, for example, melamine and polyurethane.

US 2002/0094426 A1 describes an aerogel composite article comprising an aerogel selected from the group consisting of inorganic and organic gel forming materials and a reinforcing structure.

Nevertheless, a problem that still frequently arises from aerogels imbedded in open-cell polymer foams is the dust emission while handling and cutting.

Furthermore, to enable long-term applicability under wet and humid conditions typically encountered in building and construction applications, aerogels, especially silica aerogels, can include hydrophobic groups to imbue the material with water repellence and to minimize the water uptake and water retention. However, by the inclusion of these hydrophobic groups in the aerogels, the heat of combustion of the aerogels is typically increased and the classification of the thermal insulation boards (IB) and/or the thermal insulation systems comprising these aerogels as "non-burning" is compromised as they do not achieve a certain threshold of relevant properties, such as heat of combustion, flame time, mass loss or furnace temperature rise, in certain test methods.

Therefore, the object underlying the present invention is to provide an improved thermal insulation board and/or an improved thermal insulation system comprising an aerogel, wherein the thermal insulation board and/or the thermal insulation system should be easy to handle and should show a minimal heat of combustion. Further, the thermal insulation board and/or the thermal insulation system should show an improved mechanical stability towards mechanical loads, for example, in terms of the perpendicular tensile strength.

This object is achieved by a thermal insulation board (IB) comprising at least two insulating layers (A), wherein the at least two insulating layers (A) are bonded together and wherein at least one of the at least two insulating layers (A) comprises at least one aerogel composite material comprising at least the following components (a1) to (a3)

(a1) at least one silica aerogel,
(a2) at least one polymer foam and
(a3) at least one flame retardant.

It has surprisingly been found that the inventive thermal insulation boards (IB) show a reduced dust emission compared to the dust emission of the thermal insulation boards of the state of the art having comparable thermal performance, wherein the "comparable thermal performance" in the context of the present invention means comparable U-values and R-values. The inventive thermal insulation boards (IB) are therefore easy to handle, especially while cutting and installing.

In the context of the present invention, the term "U-value" is understood to mean the rate of transfer of heat through a thermal insulation board (IB) or a thermal insulation system (IS), respectively, divided by the difference in temperature across that thermal insulation board (IB) or thermal insulation system (IS). The unit of measurement is W/m$^2$K. The better insulated a thermal insulation board (IB) or a thermal insulation system (IS), respectively, is, the lower the U-value is. The R-value is the reciprocal value of the U-value. The U- and the R-value are calculated, for example, according to Klaus Liersch, Normen Langner, "Bauphysik kompakt", Verlag Bauwerk BBB, 4. Auflage 2011, ISBN 987-3-89932-285-9, Chapter 6 "Wärmedurchgang durch ebene opake Bauteile".

Further, the inventive thermal insulation boards (IB) show a lower density, leading to a lower weight, compared to the density of the thermal insulation boards of the state of the art having comparable thermal performance.

Additionally, the inventive thermal insulation boards (IB) show a reduced thermal conductivity compared to the thermal conductivity of the thermal insulation boards of the state of the art having equivalent dimensions and, therefore, can be used in a reduced thickness to achieve comparable U- or R-values which also leads to a lower weight of the thermal insulation boards (IB).

Further, the inventive thermal insulation boards (IB) show a reduced heat of combustion and can therefore be classified as non-burning according to various building codes.

The inventive thermal insulation boards (IB) also exhibit a high mechanical stability, especially a high perpendicular tensile strength, which reduces the need for and the number of additional mechanical fixing aids like dowels when integrated into a thermal insulation system (IS).

It has also surprisingly been found that when the inventive thermal insulation board (IB) is integrated into a thermal insulation system (IS), dust emission on handling, machining and cutting is also reduced and the thermal insulation system (IS) shows lower weight and lower thickness compared to thermal insulation systems of the state of the art with a comparable thermal performance (U-value or R-value, respectively) and saves space in solving a thermal insulation problem.

The inventive thermal insulation system (IS) comprising the inventive thermal insulation board (IB) also shows a reduced heat of combustion, preferably of ≤3.0 MJ/kg and can reach values even ≤1.5 MJ/kg depending on the specific design of the overall insulation system, compared to thermal insulation systems of the state of the art, and can therefore be classified as non-burning according to various building codes.

The thermal insulation system (IS) comprising the inventive thermal insulation board (IB) also exhibits a high mechanical stability and perpendicular tensile strength, wherein, as a result, no or fewer additional mechanical fixing aids for the inventive thermal insulation board (IB) and the further layer (X) and optionally the further layers (B), (C) and (D) are necessary.

In the context of the present invention, the term "aerogel composite material" is understood to mean a material which comprises at least one aerogel and at least one further component which is immiscible with the at least one aerogel precursor. In a preferred embodiment, an "aerogel composite material" comprises at least 10% by weight, preferably at least 20% by weight, and more preferably at least 30% by weight, of the at least one aerogel, based on the total weight of the aerogel composite material. The further components can, for example, be selected from fillers, additives or foams. The aerogel composite material according to the present invention comprises at least one silica aerogel (a1) as at least one aerogel, and at least one polymer foam (a2) and at least one flame retardant (a3) as further components. As mentioned below, the aerogel composite material can also comprise further components such as infrared-absorbing or reflecting opacifiers.

In the context of the present invention, the term "aerogel" is understood to mean an aerogel as well as a xerogel. In general, a xerogel is a material produced by a sol-gel process in which the liquid phase is removed from the gel by drying below the critical temperature and above the critical pressure of the liquid phase ("subcritical conditions"). In contrast, aerogels are generally referred to as aerogels when the liquid phase is removed from the gel during the sol-gel process under "supercritical conditions" forming an open-pore, highly porous structure with air-filled pores. Aerogels can be organic or inorganic aerogels. Inorganic aerogels are, for example, selected from silica aerogels, titanium oxide aerogels, manganese oxide aerogels, calcium oxide aerogels or zirconium oxide aerogels. The aerogel comprised in the inventive thermal insulation board (IB) is at least one silica aerogel.

Definitions providing greater detail of the inventive thermal insulation board (IB) and the inventive thermal insulation system (IS) per se, and also of the inventive production process for said thermal insulation board (IB) are provided below.

Thermal Insulation Board (IB)

The inventive thermal insulation board (IB) comprises at least two insulating layers (A), and it can therefore comprise precisely two insulating layers (A) or comprise three, four, five, or even more insulating layers (A). The number of the layers of the thermal insulation board (IB) per se results from the number of the insulating layers (A) bonded together. In the case of a thermal insulation board (IB) comprising two layers per se, therefore, two insulating layers (A) are bonded together. In the case of a thermal insulation board (IB) comprising three or four layers per se, therefore, three or, respectively, four insulating layers (A) are preferably bonded together. Insofar as thermal insulation boards (IB) per se comprising an even larger number of layers are to be produced, an example being a thermal insulation board (IB) comprising ten layers, it is accordingly necessary that the number of insulating layers (A) preferably bonded together corresponds to the number of the layers, an example being ten insulating layers (A).

In the case of thermal insulation boards (IB) comprising three or more insulating layers (A) it is preferable that the individual insulating layers (A) are assembled stepwise. In the case of a thermal insulation board (IB) comprising three insulating layers (A) it is therefore preferable that the product of the first step is a thermal insulation board (IB) comprising two insulating layers (A), wherein the thermal insulation board (IB) comprising two insulating layers (A) is then bonded to another insulating layer (A) to obtain the thermal insulation board (IB) comprising three insulating layers (A). The three insulating layers (A) can be identical or different from one another (in particular in respect of their thickness and their composition), wherein at least one of the three insulating layers (A) comprises at least one aerogel composite material comprising at least the components (a1) to (a3).

The insulating layers (A) used for the bonding process correspond in respect to their chemical composition to the thermal insulation boards (IB) per se produced in the context of the process of the invention (ignoring the components optionally applied to the surfaces by way of example in the case of adhesive bonding ignoring the adhesives used).

It is preferable that the respective insulating layers (A) to be bonded together have the same dimensions and/or the same chemical composition. However, it is also possible optionally that insulating layers (A) with different dimensions and/or different chemical composition are bonded together. If, by way of example, three insulating layers (A) are bonded together, all of which have the same dimensions and (by way of example) all of which comprise at least one aerogel composite material comprising at least the components (a1) to (a3), the resultant product is a thermal insulation board (IB) comprising three insulating layers (A), all of which comprising the at least one aerogel composite material comprising at least the components (a1) to (a3).

The insulating layers (A) to be bonded together can have any desired dimensions. In respect of their length and width they can have dimensions from the centimeter range up to a number of meters. In respect of the third dimension (thickness), any desired dimensions are theoretically likewise possible, but in practice the thickness of the insulating layers (A) is preferably from 1 to 500 mm, more preferably from 5 to 100 mm, most preferably from 5 to 20 mm. The thickness of the thermal insulation boards (IB) produced in the process of the invention therefore results from the total thickness of all of the insulating layers (A) used. It is by way of example possible, however, in the case of adhesive bonding, that the resulting thermal insulation board (IB) has an increased thickness compared to the sum of the respective thicknesses of the insulating layers (A) used, as, after applying the at least one adhesive, also a "layer" comprising the at least one first adhesive (AD1) with a certain thickness is formed per pair of insulating layers (A).

In the invention the thickness is defined as the z-direction, which together with the x-direction and the y-direction, defines the dimensions of the inventive thermal insulation board (IB) (or of the layers (A), respectively) in a rectangular coordinate system. In the invention the x-direction means the length of the thermal insulation board (IB) (or of the layers (A), respectively) and the y-direction means the width of the thermal insulation board (IB) (or of the layers (A), respectively). The length of the inventive thermal insulation board (IB) (or of the layers (A), respectively) is always greater than the width and the thickness. It is preferable in the inventive thermal insulation board (IB) (and in the layers (A), respectively) that the length (x-direction) is greater than the width (y-direction) and that in turn the width is greater than the thickness (z-direction).

It is preferable that in the inventive thermal insulation board (IB), in the case of at least one pair of insulating layers (A) to be bonded, the length (x-direction) of the two insulating layers (A) is respectively from 500 to 2800 mm, preferably from 1000 to 1500 mm, their width (y-direction) is from 500 to 1250 mm, preferably from 500 to 900 mm, and their thickness (z-direction) is from 1 to 500 mm, preferably from 5 to 100 mm, more preferably from 5 to 20 mm. It is moreover preferable that in the case of thermal insulation boards (IB) comprising three or more insulating layers (A) each insulating layer (A) comprised therein has the abovementioned dimensions.

The inventive thermal insulation board (IB) is produced by a process comprising the steps a) and b) of
a) providing at least two insulating layers (A), wherein at least one of the at least two insulating layers (A) comprises at least one aerogel composite material comprising at least the following components (a1) to (a3)
(a1) at least one silica aerogel,
(a2) at least one polymer foam and
(a3) at least one flame retardant, and
b) bonding the at least two insulating layers (A) together, preferably by at least one adhesive and/or by mechanical fixing, to obtain the thermal insulation board (IB).

The present invention, therefore, also provides a process for the production of a thermal insulation board (IB) comprising the steps a) and b) of
a) providing at least two insulating layers (A), wherein at least one of the at least two insulating layers (A) comprises at least one aerogel composite material comprising at least the following components (a1) to (a3)
(a1) at least one silica aerogel,
(a2) at least one polymer foam and
(a3) at least one flame retardant, and
b) bonding the at least two insulating layers (A) together, preferably by at least one first adhesive (AD1) and/or by mechanical fixing (MF), to obtain the thermal insulation board (IB).

In case the at least two insulating layers (A) are bonded together by mechanical fixing (MF), they are preferably bonded together by sewing, clamps, rivets, dowels and/or nails.

In case the at least two insulating layers (A) are bonded together by at least one first adhesive (AD1), the at least one first adhesive (AD1) is selected from the group consisting of inorganic adhesives, organic adhesives and inorganic-organic hybrid adhesives.

In the context of the present invention, the term "at least one first adhesive (AD1)" is understood to mean exactly one first adhesive (AD1) as well as two or more first adhesives (AD1). In a preferred embodiment, the at least two insulating layers (A) are bonded together by one first adhesive (AD1).

However, it is also possible that the at least two insulating layers (A) are bonded together by at least one first adhesive (AD1) and by mechanical fixing (MF).

Inorganic adhesives preferably comprise at least one component selected from the group consisting of water glass, silicates, lime, gypsum, cement and anhydrites. Organic adhesives preferably comprise at least one component selected from the group consisting of polyurethane-based one- or two-component adhesives, unsaturated polyesters, epoxides, (meth-)acrylates and silicones. An inorganic-organic hybrid adhesive preferably comprises an organic adhesive filled with inorganic compounds.

In a preferred embodiment, the at least one first adhesive (AD1) is a polyurethane-based one- or two-component adhesive with a calorific value of <40 MJ/kg, optionally filled with inorganic compounds.

Inorganic, organic and inorganic-organic hybrid adhesives can be applied using various techniques, for example, by spraying, rolling or brushing the adhesive or its components. Optionally, the adhesive can be applied as sprayed adhesive foam, foamed adhesive or as foam adhesive.

In case the at least two insulating layers (A) are bonded together by at least one first adhesive (AD1), the at least one first adhesive (AD1) is preferably applied to at least one surface of at least one of the at least two insulating layers (A), preferably with a thickness of 0.01 to 10 mm, more preferably with a thickness of 0.01 to 5 mm and most preferably with a thickness 0.05 to 2 mm.

In one preferred embodiment, the at least one first adhesive (AD1) is applied to at least one surface of at least one of the at least two insulating layers (A) with a weight per square meter of 10 to 500 $g/m^2$, preferably with a weight per square meter of 50 to 250 $g/m^2$.

Preferably, the at least one first adhesive (AD1) is applied per pair of insulating layers (A) to be bonded to only one surface of the two starting insulating layers (A) to be bonded. For example, the at least one first adhesive (AD1) can be applied over a large area to the corresponding surface of the insulating layer (A). The first adhesive (AD1) can be applied by the usual methods, for example, by brushing, spraying, rolling, squeegees or printing. Preferably, the at least one first adhesive (AD1) is applied only to one surface of the starting insulating layers (A) to be bonded (per pair of insulating layers (A)), while no first adhesive (AD1) is applied to the second surface to be bonded.

In one preferred embodiment, the at least one first adhesive (AD1) is applied uniformly in one direction of the surface of the insulating layer (A).

In another preferred embodiment of the present invention, the at least one first adhesive (AD1) is applied in a structured, preferably spot-wise, linear or lattice-like, more preferably lattice-like, manner to at least one surface of the insulating layer (A).

This embodiment of the present invention is also referred to as structured bonding. Structured bonding with the at least one first adhesive (AD1) can be achieved by any structure or structural form. The at least one first adhesive (AD1) can preferably be applied in a structured manner to 20 to 80%, more preferably to 40 to 80%, most preferably to 50 to 75% of the respective surface of the insulating layer (A).

Insulating Layers (A)

Insulating layers per se are in principle known to the person skilled in the art. Insulating layers can comprise, for example, extruded polystyrene (XPS) foams, expanded polystyrene (EPS) foams, polyurethane foams, phenolic resin foams, wood fibers, cellulose fibers, cork, calcium silicate, gypsum, mineral foam, glass foam, mineral wool, stone wool, glass wool, glass fibers, fiberglass, and aerogels.

In the inventive thermal insulation board (IB), at least one of the at least two insulating layers (A) comprises at least one aerogel composite material comprising at least the components (a1) to (a3).

In the context of the present invention, the term "at least one of the at least two insulating layers (A)" is understood to mean exactly one insulating layer (A) as well as two or more insulating layers (A). In a preferred embodiment, each of the at least two insulating layers (A) comprises at least one aerogel composite material comprising at least the components (a1) to (a3).

In another preferred embodiment, at least one of the at least two insulating layers (A) consists essentially of the at least one aerogel composite material comprising at least the components (a1) to (a3).

In the context of the present invention, the term "consisting essentially of the at least one aerogel composite material comprising at least the components (a1) to (a3)" is understood to mean that at least one of the at least two insulating layers (A) comprises at least 99.5% by weight, preferably at least 99.9% by weight, of the at least one aerogel composite material comprising at least the components (a1) to (a3). In a more preferred embodiment, each of the at least two insulating layers (A) consists essentially of the at least one aerogel composite material comprising at least the components (a1) to (a3).

However, it is also possible that only one of the at least two insulating layers (A) comprises at least one aerogel composite material comprising at least the components (a1) to (a3) and the further layers of the at least two insulating layers (A) do not comprise the at least one aerogel composite material comprising at least the components (a1) to (a3), but instead comprise at least one different material selected from the group consisting of extruded polystyrene (XPS) foams, expanded polystyrene (EPS) foams, polyurethane foams, phenolic resin foams, wood fibers, cellulose fibers, cork, calcium silicate, gypsum, mineral foam, glass foam, mineral wool, stone wool, glass wool, glass fibers and aerogels. It is also possible that two or more insulating layers (A) comprise at least one aerogel composite material comprising at least the components (a1) to (a3) and the further layers of the at least two insulating layers (A) do not comprise the at least one aerogel composite material, but instead comprise at least one different material selected from the group consisting of extruded polystyrene (XPS) foams, expanded polystyrene (EPS) foams, polyurethane foams, phenolic resin foams, wood fibers, cellulose fibers, cork, calcium silicate, gypsum, mineral foam, glass foam, mineral wool, stone wool, glass wool, glass fibers and aerogels.

In the context of the present invention, the term "at least one aerogel composite material" is understood to mean exactly one aerogel composite material and mixtures of two or more aerogel composite materials. In a preferred embodiment, each of the at least two insulating layers (A) comprises one aerogel composite material.

Further, in the context of the present invention, the term "at least one different material" is understood to mean exactly one different material and mixtures of two or more different materials. In a preferred embodiment, each insulating layers (A) which does not comprise the at least one aerogel composite material comprising at least the components (a1) to (a3) comprises one different material. In a more preferred embodiment, each insulating layer (A) which does not comprise the at least one aerogel composite material comprising at least the components (a1) to (a3) consists essentially of one different material.

Aerogel Composite Material

The at least one aerogel composite material comprises at least the following components (a1) to (a3):
(a1) at least one silica aerogel,
(a2) at least one polymer foam and
(a3) at least one flame retardant.

The at least one aerogel composite material may comprise the at least one silica aerogel (a1), the at least one polymer foam (a2) and the at least one flame retardant (a3) in any desired amounts.

Preferably, the at least one aerogel composite material comprises at least 10% by weight, more preferably at least 20% by weight and most preferably at least 30% by weight of component (a1), in each case based on the sum of the weight percentages of the at least one silica aerogel (a1), the at least one polymer foam (a2) and the at least one flame retardant (a3), preferably based on the total weight of the at least one aerogel composite material.

Likewise, the at least one aerogel composite material preferably comprises not more than 94% by weight, more preferably not more than 80% by weight and most preferably not more than 70% by weight of component (a1), in each case based on the sum of the weight percentages of the at least one silica aerogel (a1), the at least one polymer foam (a2) and the at least one flame retardant (a3), preferably based on the total weight of the at least one aerogel composite material.

In a preferred embodiment, the at least one aerogel composite material comprises from 10 to 94% by weight, preferably from 20 to 80% by weight and more preferably from 30 to 70% by weight of component (a1), in each case based on the sum of the weight percentages of the at least one silica aerogel (a1), the at least one polymer foam (a2) and the at least one flame retardant (a3), preferably based on the total weight of the at least one aerogel composite material.

Preferably, the at least one aerogel composite material comprises at least 1% by weight and more preferably at least 3% by weight of component (a2), in each case based on the sum of the weight percentages of the at least one silica aerogel (a1), the at least one polymer foam (a2) and the at least one flame retardant (a3), preferably based on the total weight of the at least one aerogel composite material.

Likewise, the at least one aerogel composite material preferably comprises not more than 20% by weight, more preferably not more than 15% by weight and most preferably not more than 10% by weight of component (a2), in each case based on the sum of the weight percentages of the at least one silica aerogel (a1), the at least one polymer foam (a2) and the at least one flame retardant (a3), preferably based on the total weight of the at least one aerogel composite material.

In a preferred embodiment, the at least one aerogel composite material comprises from 1 to 20% by weight, preferably from 1 to 15% by weight and more preferably from 3 to 10% by weight of component (a2), in each case based on the sum of the weight percentages of the at least one silica aerogel (a1), the at least one polymer foam (a2) and the at least one flame retardant (a3), preferably based on the total weight of the at least one aerogel composite material.

Preferably, the at least one aerogel composite material comprises at least 5% by weight, more preferably at least 19% by weight and most preferably at least 27% by weight, of component (a3), in each case based on the sum of the weight percentages of the at least one silica aerogel (a1), the at least one polymer foam (a2) and the at least one flame retardant (a3), preferably based on the total weight of the at least one aerogel composite material.

Likewise, the at least one aerogel composite material preferably comprises not more than 70% by weight, more preferably not more than 65% by weight and most preferably not more than 60% by weight of component (a3), in each case based on the sum of the weight percentages of the at least one silica aerogel (a1), the at least one polymer foam (a2) and the at least one flame retardant (a3), preferably based on the total weight of the at least one aerogel composite material.

In a preferred embodiment, the at least one aerogel composite material comprises from 5 to 70% by weight, preferably from 19 to 65% by weight and more preferably from 27 to 60% by weight of component (a3), in each case based on the sum of the weight percentages of the at least one silica aerogel (a1), the at least one polymer foam (a2) and the at least one flame retardant (a3), preferably based on the total weight of the at least one aerogel composite material.

Therefore, it is preferable, when the at least one aerogel composite material comprises in the range from 10 to 94% by weight of the at least one silica aerogel (a1), in the range from 1 to 20% by weight of the at least one polymer foam (a2) and in the range from 5 to 70% by weight of the at least one flame retardant (a3), in each case based on the sum of the weight percentages of the at least one silica aerogel (a1), the at least one polymer foam (a2) and the at least one flame retardant (a3), preferably based on the total weight of the at least one aerogel composite material.

It is particularly preferable when the at least one aerogel composite material comprises in the range from 20 to 80% by weight of the at least one silica aerogel (a1), in the range from 1 to 15% by weight of the at least one polymer foam (a2) and in the range from 19 to 65% by weight of the at least one flame retardant (a3), in each case based on the sum of the weight percentages of the at least one silica aerogel (a1), the at least one polymer foam (a2) and the at least one flame retardant (a3), preferably based on the total weight of the at least one aerogel composite material.

It is most preferable when the at least one aerogel composite material comprises in the range from 30 to 70% by weight of the at least one silica aerogel (a1), in the range from 3 to 10% by weight of the at least one polymer foam (a2) and in the range from 27 to 60% by weight of the at least one flame retardant (a3), in each case based on the sum of the weight percentages of the at least one silica aerogel (a1), the at least one polymer foam (a2) and the at least one flame retardant (a3), preferably based on the total weight of the at least one aerogel composite material.

The % by weight values of the at least one silica aerogel (a1), the at least one polymer foam (a2) and the at least one flame retardant (a3) thus typically sum to 100%.

The at least one aerogel composite material may further comprise at least one infrared-absorbing or reflecting opacifier in addition to the at least one silica aerogel (a1), the at least one polymer foam (a2) and the at least one flame retardant (a3).

In the context of the present invention "at least one infrared-absorbing or reflecting opacifier" is to be understood as meaning either precisely one infrared-absorbing or reflecting opacifier or else a mixture of two or more infrared-absorbing or reflecting opacifiers.

The at least one aerogel composite material may comprise for example in the range from 0.1 to 10% by weight of the at least one infrared-absorbing or reflecting opacifier, based on the total weight of the at least one aerogel composite material. It is preferable when the at least one aerogel composite material comprises in the range from 1 to 5% by weight of the at least one infrared-absorbing or reflecting opacifier, based on the total weight of the at least one aerogel composite material.

It will be appreciated that when the at least one aerogel composite material comprises at least one infrared-absorbing or reflecting opacifier, the % by weight values of the at least one silica aerogel (a1) present in the at least one aerogel composite material are correspondingly reduced so that the sum of the % by weight values of the at least one silica aerogel (a1), the at least one polymer foam (a2), the at least one flame retardant (a3) and the at least one infrared-absorbing or reflecting opacifier sum to 100%.

Suitable infrared-absorbing or reflecting opacifiers are known per se to those skilled in the art. The infrared-absorbing or reflecting opacifiers are preferably selected from the group consisting of carbon black, graphite, boron carbide, metal oxides and metal carbides, more preferably from metal oxides.

Examples for suitable metal oxides are titanium oxide, iron oxide and manganese oxide.

The at least one aerogel composite material has preferably a density of 0.10 to 0.40 g/cm$^3$, more preferably of 0.15 to 0.25 g/cm$^3$, determined according to ASTM C167.

Further, the at least one aerogel composite material has preferably a thermal conductivity of $\lambda$ of $\leq 0.030$ W/(mK), more preferably of $\lambda$ of $\leq 0.020$ W/(mK), determined according to DIN EN 12667:2001-05.

The at least one aerogel composite material can have hydrophobic properties. In a further preferred embodiment, the at least one aerogel composite material has a liquid water uptake of $\leq 20\%$ by weight, preferably of $\leq 10\%$ by weight, more preferably of $\leq 5\%$ by weight, most preferably of $\leq 1\%$ by weight, based on the total weight of the at least one aerogel composite material. Liquid water uptake is one expression of the hydrophobicity of an aerogel or aerogel composite material. Within the context of the present invention, the term "liquid water uptake" refers to a measurement of the potential of an aerogel or aerogel composite material to absorb or otherwise retain liquid water. Liquid water uptake can be expressed as a percent (by weight or by volume) of water that is absorbed or otherwise retained by an aerogel or aerogel composite material when exposed to liquid water under certain measurement conditions. The liquid water uptake of an aerogel or aerogel composite material may be determined by methods known in the art, including, but not limited to DIN EN 12087:2013-06, method 2. An aerogel or aerogel composite material that has improved liquid water uptake relative to another aerogel or aerogel composite material will have a lower percentage of liquid water uptake/retention relative to the reference aerogels or aerogel composite materials.

In another preferred embodiment, the at least one aerogel composite material has preferably a heat of combustion of $\leq 3.0$ MJ/kg, determined according to EN ISO 1716:2010-11.

It has further preferably a furnace temperature rise of $\leq 50°$ C., a mass loss of $\leq 50\%$ and a flame time of $\leq 20$ s, determined according to ISO 1182:2010.

In an especially preferred embodiment, the at least one aerogel composite material has a liquid water uptake of $\leq 10\%$ by weight, a thermal conductivity of $\lambda$ of $\leq 0.020$ W/(mK) and a heat of combustion of $\leq 3.0$ MJ/kg.

Silica Aerogel (a1)

The at least one aerogel composite material comprises at least one silica aerogel (a1).

The terms "at least one silica aerogel", "silica aerogel" and "component (a1)" are used synonymously in the context of the present invention and have the same meaning. Furthermore, in the context of the present invention, the term "at least one silica aerogel" is understood to mean exactly one silica aerogel and mixtures of two or more silica aerogels. In a preferred embodiment, the at least one aerogel composite material comprises one silica aerogel.

Silica aerogels are known in principle to those skilled in the art. They are usually prepared from gel precursors by sol-gel-processes.

Examples for suitable gel precursors are metal silicates such as sodium silicate and potassium silicate, and alkoxysilanes such as tetramethoxysilane (TMOS) and tetraethoxysilane (TEOS).

However, it is also possible to use gel precursors comprising at least one hydrophobic group to impart or improve certain properties in the resulting silica aerogel such as stability and hydrophobicity. It is clear for a skilled person that by the use of gel precursors comprising at least one hydrophobic group, the resulting silica aerogel also comprises at least one hydrophobic group bound to at least one silicon atom.

Suitable gel precursors comprising at least one hydrophobic group are alkylsilanes and arylsilanes such as trimethyl methoxysilane (TMS), dimethyl dimethoxysilane (DMS), methyl trimethoxysilane (MTMS), trimethyl ethoxysilane, dimethyl diethoxysilane (DMDS), methyl triethoxysilane (MTES), ethyl triethoxysilane (ETES), diethyl diethoxysilane, ethyl triethoxysilane, propyl trimethoxysilane, propyl triethoxysilane, phenyl trimethoxysilane and phenyl triethoxysilane (PhTES).

In a preferred embodiment, the silica aerogels are prepared from a mixture comprising gel precursors comprising at least one hydrophobic group and gel precursors selected from tetramethoxysilane (TMOS) and tetraethoxysilane (TEOS).

However, it is also possible to treat the gels with a hydrophobizing agent to impart or improve stability and/or hydrophobicity of the resulting silica aerogel. The hydrophobic treatment can be performed by immersing a gel in a mixture comprising a hydrophobizing agent and a solvent in which the hydrophobizing agent is soluble, and which is also miscible with the gel solvent in the wet-gel. Suitable solvents are, for example, methanol, ethanol, isopropanol, xylene, toluene, benzene, dimethylformamide and hexane. However, hydrophobizing agents in liquid or gaseous form may also be directly contacted with the gel to impart hydrophobicity.

Examples of hydrophobizing agents include, but are not limited to trimethylchlorosilane (TMCS), triethylchlorosilane (TECS), triphenylchlorosilane (TPCS), dimethylchlorosilane (DMCS), dimethyldichlorosilane (DMDCS) or in general alkyl or aryl alkoxysilanes or alkyl disilazanes or alkyl disiloxanes, such as hexamethyldisilazane or hexamethyldisiloxane.

In a preferred embodiment, the at least one silica aerogel (a1) comprises in the range from 1 to 25% by weight, preferably in the range from 1 to 10% by weight, of at least one hydrophobic group, based on the total weight of the at least one silica aerogel (a1), wherein the at least one hydrophobic group is bound to at least one silicon atom.

The at least one silica aerogel (a1) can be a monolithic aerogel, a particulate aerogel, or combinations thereof. Within the context of the present invention, the term "monolithic" means that a majority (by weight) of the aerogel is in the form of a unitary interconnected aerogel nanostructure. Monolithic aerogels can be initially formed to have a unitary interconnected gel or aerogel nanostructure, but can be subsequently cracked, fractured, or segmented into non-unitary aerogel nanostructures. Monolithic aerogels are differentiated from particulate aerogels. Within the context of the present invention, the term "particulate" means that a majority (by weight) of the aerogel is in the form of particulates, particles, granules, beads, or powders, which can be combined or compressed together but which lack an interconnected aerogel nanostructure between individual particles.

Polymer Foam (a2)

The at least one aerogel composite material comprises at least one polymer foam (a2).

The terms "at least one polymer foam", "polymer foam" and "component (a2)" are used synonymously in the context of the present invention and have the same meaning. Furthermore, in the context of the present invention, the term "at least one polymer foam" is understood to mean exactly one polymer foam and mixtures of two or more polymer foams. In a preferred embodiment, the at least one aerogel composite material comprises one polymer foam.

Polymer foams are known in principle to those skilled in the art.

Polymer foams can be open-cell polymer foams or closed-cell polymer foams. The at least one polymer foam (a2) comprised in the at least one aerogel composite material is preferably an open-cell polymer foam.

In the context of the present invention, the term "open-cell polymer foam" is understood to mean a polymer foam comprising a plurality of closely spaced cells with cavities filled, for example, with air and/or another gas, the cavities being interconnected by openings in the walls of the respective cells.

The cells whose cavities are interconnected by openings in the walls of the respective cells are also referred to as "open cells". Open-cell polymer foams, preferably open-cell polymer foams with wettable cell walls, are usually capable of absorbing liquids by capillary action. An open-cell polymer foam comprises more than 50% open cells (based on the total number of cells in the open-cell polymer foam). Consequently, closed cells may also be present in the open-cell polymer foams.

In the context of the present invention, "closed cells" are cells whose cavities are not interconnected by openings in the walls of the respective cells. In the present invention, an open-cell polymer foam always comprises more open cells than closed cells (based on the total number of cells).

Preferably the open-cell polymer foam comprises at least 60%, preferably at least 80%, more preferably at least 90%, open cells, based on the total number of cells in the open-cell polymer foam.

A "closed-cell polymer foam" comprises more than 50% closed cells (based on the total number of cells in the closed-cell polymer foam). As a result, open cells can also be comprised in the closed-cell polymer foam. In the context of this invention, a closed-cell polymer foam always comprises more closed cells than open cells (based on the total number of cells).

Preferably, the closed-cell polymer foam comprises at least 80%, preferably at least 90%, more preferably at least 95%, closed cells, based on the total number of cells in the closed-cell polymer foam.

Open-cell or closed-cell polymer foams as such, as well as their manufacturing processes, are known to those skilled in the art. They can be produced, for example, by foaming processes, wherein, in a first step, gas is usually blown into suitable liquids, preferably melted polymers or polymer educts, or foam formation is achieved by vigorous beating, shaking, spraying or stirring of the liquid in a gas atmosphere. Afterwards, the liquid is usually cured in a second step to obtain an open-cell or closed-cell polymer foam. Whether a (predominantly) open-cell or closed-cell polymer foam results depends, among other things, on the volume of the liquid, the mechanical conditions, the pressure and the temperature.

Polymer foams can also be thermoplastic or thermoset polymer foams. In the context of the present invention, an open-cell thermoset polymer foam is preferred. In a more preferred embodiment, the at least one polymer foam (a2) comprised in the at least one aerogel composite material is an open-cell melamine-based foam or an open-cell urethane-based foam, preferably an open-cell melamine-based foam.

It is further preferred that the at least one polymer foam (a2) comprised in the at least one aerogel composite material has a density of 0.002 to 0.025 g/cm$^3$, preferably of 0.005 to 0.015 g/cm$^3$, determined according to EN ISO 845:2009-10.

Flame Retardant (a3)

The at least one aerogel composite material comprises at least one flame retardant.

The terms "at least one flame retardant", "flame retardant" and "component (a3)" are used synonymously in the context of the present invention and have the same meaning. Furthermore, in the context of the present invention, the term "at least one flame retardant" is understood to mean exactly one flame retardant and mixtures of two or more flame retardants. In a preferred embodiment, the at least one aerogel composite material comprises mixtures of two or more flame retardants.

Flame retardants are known in principle to those skilled in the art.

The at least one flame retardant in the context of the present invention is preferably selected from inorganic compounds, more preferably from the group consisting of clay minerals, low melting glasses, metal oxides, metal oxide hydroxides, metal hydroxides, carbonates and hydrocarbonates, most preferably from clay minerals, metal oxides, metal oxide hydroxides and metal hydroxides.

Suitable clay minerals are, for example, aluminium silicate clays, phyllosilicate clays, kaolinite, halloysite, endellite, mica, diaspore, gibbsite, montmorillonite, beidellite, pyrophyllite, nontronite, bravaisite, smectite, leverrierite, rectorite, celadonite, attapulgite, chloropal, volkonskoite, allophane, racewinite, dillnite, severite, miloschite, collyrite, cimolite and newtonite.

Suitable low melting glasses are, for example, glass beads.

Suitable metal oxides are, for example, magnesium oxide and titanium oxide.

Suitable metal hydroxides are, for example, magnesium hydroxide and aluminium hydroxide.

The at least one aerogel composite material is, for example, produced by a process comprising the following successive steps a) to d) of a) casting a sol comprising at least one gel precursor, at least one solvent and at least one flame retardant (a3) in a reactor in which at least one polymer foam (a2) is placed, wherein the at least one gel precursor is a gel precursor for the preparation of at least one aerogel (a1), b) gelation of the at least one gel precursor in the at least one polymer foam (a2) to obtain at least one lyogel, wherein the at least one lyogel comprises the gelled at least one gel precursor, the at least one solvent and the at least one flame retardant (a3), c) drying the at least one lyogel obtained in step b) to remove the at least one solvent from the at least one lyogel and to obtain the at least one aerogel composite material comprising the at least one aerogel (a1), the at least one polymer foam (a2) and the at least one flame retardant (a3), and d) removing the at least one aerogel composite material obtained in step c) from the reactor.

However, the at least one flame retardant (a3) may be added at any stage of the process for the production of the at least one aerogel composite material. For example, it can also be added during steps a), b), c) or d), or between steps a) and b), between steps b) and c) or between steps c) and d) or after step d).

In a preferred embodiment, the at least one flame retardant (a3) is embedded in the at least one silica aerogel (a1).

Thermal Insulation System (IS)

The present invention also provides a thermal insulation system (IS) comprising the inventive thermal insulation board (IB) and a fixing layer (X), wherein the fixing layer (X) affixes the thermal insulation board (IB) on a building wall (BW).

In the context of the present invention, the terms "fixing layer" and "layer (X)" are used synonymously and have the same meaning. The building wall (BW) can be an exterior and/or interior building wall (BW), floor, roof and/or ceiling.

It is clear for a skilled person that the fixing layer (X) affixes the thermal insulation board (IB) on a building wall (BW) such that in the thermal insulation system (IS) there is the fixing layer (X) between the building wall (BW) and the thermal insulation board (IB).

The fixing layer (X) preferably comprises at least one second adhesive (AD2) selected from the group consisting of inorganic adhesives and organic adhesives, more preferably consists of at least one adhesive selected from the group consisting of inorganic adhesives and organic adhesives, most preferably the fixing layer (X) consists of mortar. A suitable mortar can, for example, be purchased from Knauf under the tradename Knauf SM 300 or SM 700.

It is possible that the at least one second adhesive (AD2) is the same as the at least one first adhesive (AD1). However, it is also possible that the at least one second adhesive (AD2) is different from the at least one first adhesive (AD1).

In a preferred embodiment, the fixing layer (X) has a thickness of 0.5 to 30 mm, preferably of 1 to 10 mm. It is also preferable that the thickness of the fixing layer (X) is greater than the thickness with which the at least one first adhesive (AD1) is applied to at least one surface of at least one of the at least two insulating layers (A) in the thermal insulation board (IB).

The thermal insulation system (IS) preferably further comprises an upper layer (B) which is bonded to the thermal insulation board (IB) such that in the thermal insulation system (IS) there is the thermal insulation board (IB) between the fixing layer (X) and the upper layer (B).

In the context of the present invention, the terms "upper layer" and "layer (B)" are used synonymously and have the same meaning.

Preferably, the upper layer (B) comprises at least one third adhesive (AD3) selected from the group consisting of inorganic adhesives and organic adhesives, and optionally at least one reinforcing material selected from the group consisting of meshes, fibers, fleeces and fabrics, more preferably from meshes and fibres.

Suitable inorganic adhesives are render and mortar. Suitable organic adhesives are polymer-based adhesives. Preferably, the upper layer (B) comprises mortar.

It is possible that the at least one second adhesive (AD3) is the same as the at least one first adhesive (AD1) and/or the at least one second adhesive (AD2). However, it is also possible that the at least one second adhesive (AD2) is different from the at least one first adhesive (AD1) and/or the at least one second adhesive (AD2).

The upper layer (B) has preferably a thickness of 0.5 to 30 mm, more preferably of 1 to 10 mm. It is clear for a skilled person that it is also preferable that the thickness of the upper layer (B) is greater than the thickness with which the at least one first adhesive (AD1) is applied to at least one surface of at least one of the at least two insulating layers (A) in the thermal insulation board (IB).

It is clear for a skilled person that the upper layer (B) is affixed to the thermal insulation board (IB) by the at least one third adhesive (AD3) comprised in the upper layer (B).

In a further preferred embodiment, the thermal insulation system (IS) also comprises a finishing layer (C) bonded to the upper layer (B).

In the context of the present invention, the terms "finishing layer" and "layer (C)" are used synonymously and have the same meaning.

It is clear for a skilled person that the finishing layer (C) is bonded to the upper layer (B) such that in the thermal insulation system (IS) there is the upper layer (B) between the finishing layer (C) and the thermal insulation board (IB).

The finishing layer (C) preferably comprises plaster or render. Suitable plasters and renders can comprise inorganic and/or organic components. Examples for suitable inorganic components are gypsum, cement, lime and silicates; examples for suitable organic components are polystyrene and polyacrylates.

The finishing layer (C) has preferably a thickness of 0.5 to 40 mm and more preferably of 2 to 20 mm.

It is clear for a skilled person that the finishing layer (C) is affixed to the upper layer (B) by the at least one adhesive comprised in the upper layer (B) and/or by the plaster or render comprised in the finishing layer (C).

In a further preferred embodiment, the thermal insulation system (IS) also comprises a surface finishing layer (D) bonded to the finishing layer (C).

It is clear for a skilled person that the surface finishing layer (D) is bonded to the finishing layer (C) such that in the thermal insulation system (IS) there is the finishing layer (C) between the upper layer (B) and the surface finishing layer (D).

In the context of the present invention, the terms "surface finishing layer" and "layer (D)" are used synonymously and have the same meaning.

The surface finishing layer (D) preferably comprises a coating, a lamination, a film, a foil or a paint, preferably a paint for exterior or interior walls well known to those skilled in the art. The paint is preferably applied in the form of a paint based on an aqueous dispersion or emulsion of inorganic pigments with organic binders such as acrylic, vinylic, polyurethane, polyester, epoxy or silicone polymers.

The surface finishing layer (D) has preferably a thickness of 0.001 to 10 mm, more preferably of 0.002 to 2 mm.

It is clear for a skilled person that by affixing the thermal insulation board (IB) on a building wall (BW) by the fixing layer (X), also the layer (B) optionally bonded to the thermal insulation board (IB), the layer (C) optionally bonded to the layer (B) and the layer (D) optionally bonded to the layer (C), are affixed on the building wall (BW) and consequently, the thermal insulation system (IS) as a whole is affixed on the building wall (BW).

The thermal insulation board (IB) and/or the thermal insulation system (IS), respectively, can be affixed on an exterior and/or interior building wall (BW), floor, roof and/or ceiling by the fixing layer (X) alone, or they can additionally be affixed by mechanical fixing, preferably by dowels, nails, screws and/or rails.

It is also possible that the inventive thermal insulation board (IB) and/or the inventive thermal insulation system (IS) are directly affixed on an exterior and/or interior building wall (BW), floor, roof and/or ceiling by the fixing layer (X), or, indirectly, by pre-installing the inventive thermal insulation board (IB) and/or the inventive thermal insulation system (IS) on a carrier board, wherein the carrier board preferably comprises at least one component selected from the group consisting of magnesium oxide, calcium silicate, plaster, gypsum, wood, plywood, wood fibers, flakes, particles and chips, and wherein the carrier board is affixed on an exterior and/or interior building wall (BW), floor, roof and/or ceiling by the fixing layer (X).

Figure 1:
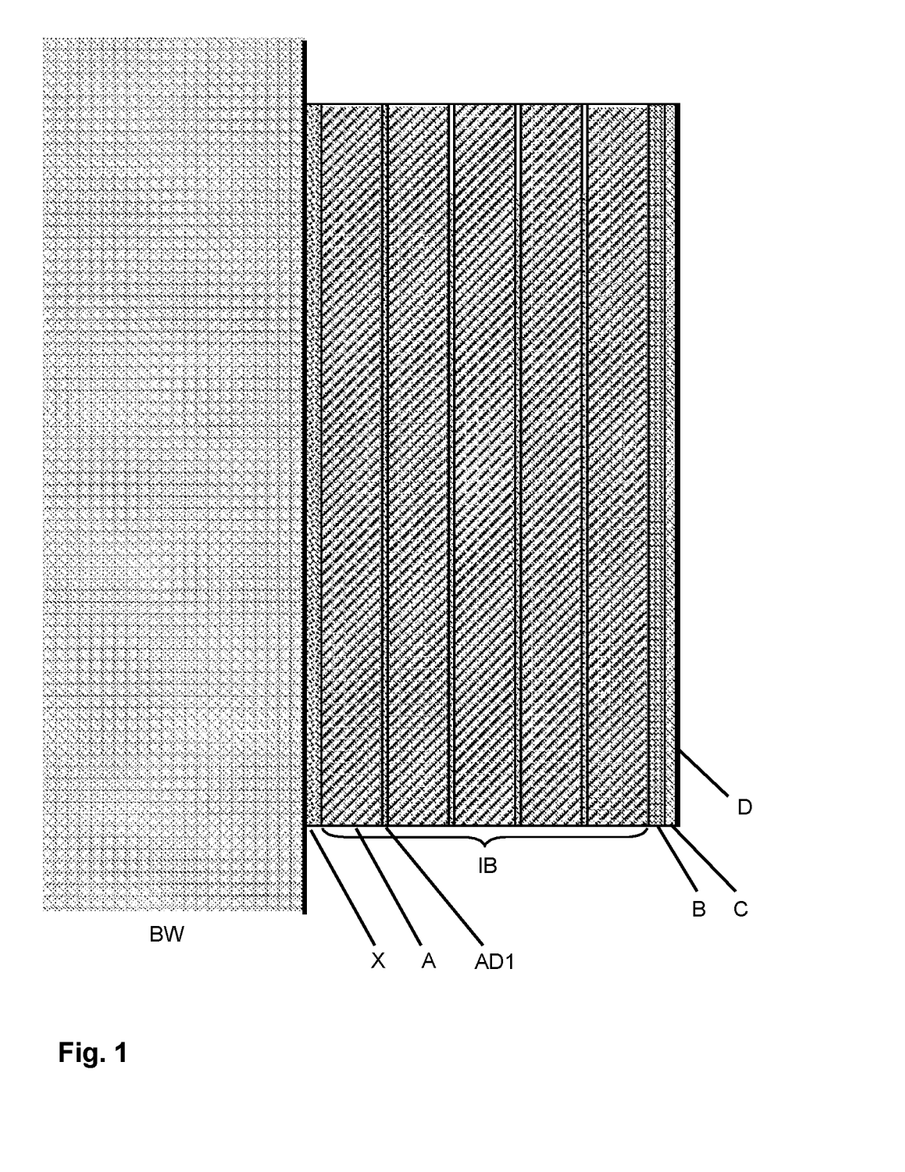

In FIG. 1, one embodiment of an inventive thermal insulation board (IB) and of an inventive thermal insulation system (IS), respectively, is schematically shown: The inventive thermal insulation board (IB) comprises five insulating layers (A) which are bonded together by at least one first adhesive (AD1). The inventive thermal insulation board (IB) is affixed to a building wall (BW) by a fixing layer (X) to obtain the inventive thermal insulation system (IS). An upper layer (B) is bonded to the thermal insulation board (IB) such that in the thermal insulation system (IS) there is the thermal insulation board (IB) between the fixing layer (X) and the upper layer (B). To the upper layer (B) a finishing layer (C) is bonded. To the finishing layer (C) a surface finishing layer (D) is bonded.

Figure 2:
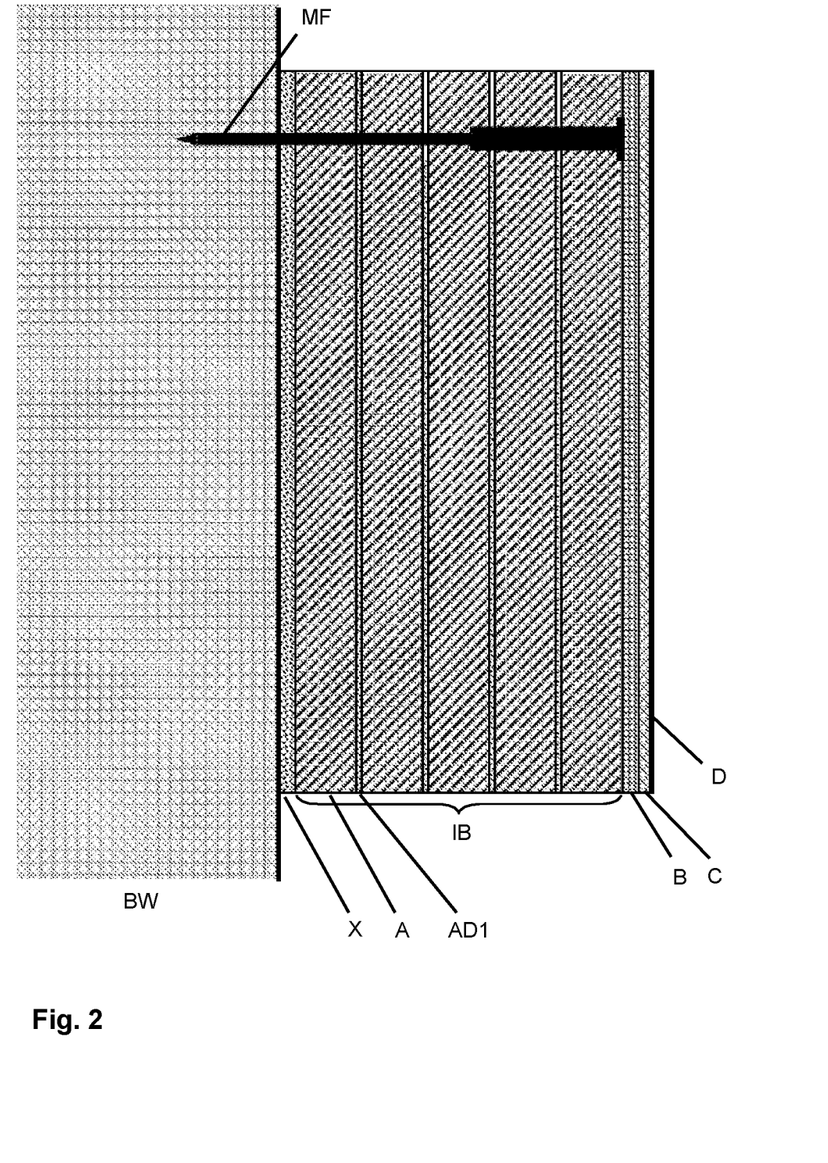

In FIG. 2, another embodiment of an inventive thermal insulation board (IB) and of an inventive thermal insulation system (IS), respectively, is schematically shown: The inventive thermal insulation board (IB) comprises five insulating layers (A) which are bonded together by at least one first adhesive (AD1). The inventive thermal insulation board (IB) is affixed to a building wall (BW) by a fixing layer (X) to obtain the inventive thermal insulation system (IS). An upper layer (B) is bonded to the thermal insulation board (IB) such that in the thermal insulation system (IS) there is the thermal insulation board (IB) between the fixing layer (X) and the upper layer (B). To the upper layer (B) a finishing layer (C) is bonded. To the finishing layer (C) a surface finishing layer (D) is bonded. The thermal insulation board is additionally affixed to the building wall (BW) by mechanical fixing (MF).

Use

The present invention, therefore, also provides the use of an inventive thermal insulation board (IB) or of an inventive thermal insulation system (IS) for the thermal insulation of buildings, parts and/or elements of buildings, preferably of exterior and/or interior building walls, floors, roofs and/or ceilings, more preferably for the thermal insulation of exterior and/or interior building walls, floors, roofs and/or ceilings in multi-layered external thermal insulation composite systems (ETICS), in multi-layered exterior insulation façade systems (EIFS), in ventilated or curtain façade systems and/or in interior insulation systems.

For example, the inventive thermal insulation system (IS) is used behind a façade system, a cladding, a facing or a cover applied to an exterior or interior building wall (BW), preferably in a ventilated façade system, behind rainscreen or cladding elements that are connected to the exterior building wall (BW) via a carrying substructure. In this case the thermal insulation system (IS) is optionally bonded to the wall by at least one adhesive or by mechanical fixing and optionally equipped with a finishing fleece, fabric or other coating or lamination.

Further, the inventive thermal insulation system (IS) is, for example, used in façade cassette systems, infill façade panels, framework, frame or paneled constructions, post and beam and post and mullion façades, element façades, curtain walls and curtain façades, double skin façades, perforated, pierced or punctuated façades, banded façades, component façades, integral façades and in façade components with integrated functions, for example, green façades, integrated photovoltaics, ventilated or heated façades.

The inventive thermal insulation system (IS) can also find beneficial use, for example, in a wide field of other applications in the building and construction segment, such as in thermal bridges and in thermal decoupling, for example, in façade joints, consoles and anchors, in or behind roller shutters or other shading elements, mail boxes, cable ducts, shafts for pipes, tubes and conduits, interior or exterior window or door reveals, frames, jambs, lintels or sills, in covers (rondella) for dowels in ETICS or in joint sealing tapes. It can also find use, for example, in thermal insulation of interior walls, especially in niches, alcoves, recesses, openings or cavities, for example, radiator niches or window alcoves, in thermal insulation and thermal insulation systems (IS) in drywall construction including, for example, plasterboards, wallboards, gypsum boards, post and beam and framework constructions, partition elements, wall stud elements or lining and furring elements.

The inventive thermal insulation system (IS) finds also use, for example, in thermal insulation of cavity walls and hollow spaces between walls, in thermal insulation of roofs, especially pitched and flat roofs, including inverted roofs, protected membrane roofs, green roofs, ventilated roofs and insulation between, on top of or under rafters and insulation of baffles, attic and jamb walls, in thermal insulation of floors, raised floors, underfloors, hollow floors, crawl spaces, terraces, balconies, ceilings, basement ceilings, park deck ceilings, soffits and in insulation of floor or wall heating or cooling systems. It can also be used, for example, in thermal insulation of doors, gates, door and gate fillings, including sliding, roller or sectional doors and gates, window profiles and frames, and other hollow profiles in buildings and construction, for example, inserted into a profile as pre-made insulation element or inserted as insulation element in a continuous extrusion- or pultrusion process, in thermal insulation of fire protection and fire prevention systems, and as non-combustible, non-burning element or part in such applications, for example, fire barriers, fire breaks, fire locks, fire protection stripes, fire protection doors, gates or curtains, smoke vents or roof domes, in thermal insulation of residential conduits, ducts, vents and pipes and systems in building services and technical building installations, for example, boilers, heaters, hot- and cold-water supply, solar thermal power generation, air conditioning and air supply systems as well as cold stores and cold-storage rooms.

Beyond the area of building and construction, the inventive thermal insulation system (IS) can also be employed, for example, in other thermal insulation applications, such as household and commercial appliances, for example, refrigerators, coolers, freezers, iceboxes, refrigerated shelves and display cases, vending machines, ovens, as part or component of thermally insulating curtains or separating or dividing elements in, for example, containers, reefers, cold storages, in thermal insulation of transport and logistic containers and boxes, for example, for transport of medicine, vaccines, medical samples, organs, blood, beverages, food or other perishable goods, in thermal insulation of electronic devices, consumer electronics and wearable electronics, for example, computers, tablet PCs, laptop PCs, displays, screens and monitors, mobile and smart phones, sensors, in thermal insulation of clothing, functional clothing, apparel and sportswear, including sports and outdoor equipment, for example, cooler bags, tents, sleeping bags, shoes, sport shoes and boots, shoe soles and insoles, jackets, gloves and headwear, in thermal insulation of cars and vehicles, including thermal insulation of parts of vehicles with an internal combustion engine, for example, power train, engine compartment, engine cover, engine encapsulation, exhaust system, catalyst system, transmission tunnel, tanks and respective pipes and lines, for example, for fuel, liquefied gasses, media for treatment of exhaust gasses, for example, urea solution, thermal insulation of parts of vehicles with hybrid or electric drive systems, for example, thermal protection in between battery cells, battery module and casing, power electronics, electric engine, fuel cell, tanks and respective pipes and lines for media like hydrogen and parts of the passenger cabin and vehicle body, for example, headliner, roof liner, underbody, doors, trims, firewall, back wall, in thermal insulation of commercial, utility and construction vehicles and machines, for example, trucks, dump trucks, tank trucks, asphalt mixers, road pavers, tractors, vans, cranes, tunnel boring machines, mining vehicles and machines, including respective trailers, containers and structures of such vehicles, for example, reefers, in thermal insulation of the interior and exterior of busses, trams, trains and respective coaches, cars and wagons, in thermal insulation of the interior, exterior, cabins or parts of military and armored vehicles, in thermal insulation of the interior, exterior, cabins or parts of airplanes, helicopters, satellites and other aerospace vehicles and equipment, in thermal insulation of the interior, exterior, cabins or parts of marine vessels, ships, boats or yachts, and in thermal insulation of the interior, exterior, cabins or parts of caravans, trailer caravans, camper vehicles, mobile homes, including elevating and pop-top roofs.

The invention is illustrated below with reference to examples.

EXAMPLES

Table 1 states the essential parameters of the insulating layers (A) used in the thermal insulation boards (IB) according to inventive examples E1 to E3, and table 2 states the essential parameters of the insulating layers (A*) used in the thermal insulation boards (IB) according to comparative examples C1 to C3.

TABLE 1

| Layer | Material | Composition of the material | λ [W/(mK)] | Heat of combustion per weight [MJ/kg] | Density [g/cm$^3$] | Thickness [mm] | Perpendicular tensile strength [kPa] |
|---|---|---|---|---|---|---|---|
| A1 | Aerogel composite material | comprises at least one silica aerogel, at least one open-cell melamine-based foam and at least one flame retardant | 0.016 | 2.9 | 0.16 | 5 | 15 |
| A2 | Aerogel composite material | comprises at least one silica aerogel, at least one open-cell melamine-based foam and at least one flame retardant | 0.016 | 2.9 | 0.16 | 10 | 15 |
| A3 | | Stone wool | 0.035 | 1.7 | 0.12 | 55 | 5 |

TABLE 2

| Layer | Material | Composition of the material | λ [W/(mK)] | Heat of combustion per weight [MJ/kg] | Density [g/L] | Thickness [mm] | Perpendicular tensile strength [kPa] |
|---|---|---|---|---|---|---|---|
| A*1 | | Stone wool | 0.035 | 1.7 | 0.12 | 100 | 5 |
| A*2 | | Stone wool | 0.035 | 1.7 | 0.12 | 60 | 5 |
| A*3 | Aerogel composite material | Comprises from 25 to 95 % by weight of silica aerogel and | 0.019 | 2.7 | 0.21 | 10 | 8 |

TABLE 2-continued

| Layer | Material | Composition of the material | λ [W/(mK)] | Heat of combustion per weight [MJ/kg] | Density [g/L] | Thickness [mm] | Perpendicular tensile strength [kPa] |
|---|---|---|---|---|---|---|---|
| A*4 | Aerogel composite material | from 5 to 75 % by weight of inorganic fibers Comprises from 25 to 95 % by weight of silica aerogel and from 5 to 75 % by weight of inorganic fibers | 0.019 | 2.7 | 0.21 | 5 | 8 |

The thermal conductivity λ is determined according to DIN EN 12667:2001-05 and DIN EN 13162.

The heat of combustion per weight is determined according to DIN EN ISO 1716:2010-11.

The density is determined according to DIN EN 1602: 2013-05.

The perpendicular tensile strength is determined according to DIN EN 1607:2013-05

Table 3 states the composition and the overall thickness of the thermal insulation boards (IB) according to inventive examples E1 to E3; table 4 states the composition and the overall thickness of the thermal insulation boards according to comparative examples C1 to C3. In the present case, the composition means the order in which the different layers are bonded together.

TABLE 3

| Example | Composition | Overall Thickness [mm] |
|---|---|---|
| E1 | 4 layers of A2 and one layer of A1 are bonded together by a polyurethane-based adhesive filled with inorganic compounds in the following order: A2 A2 A2 A2 A1 to obtain a board comprising five insulating layers (A) | 45 |
| E2 | 4 layers of A2 and one layer of A1 are bonded together by mortar (mortar thickness: 1 mm) in the following order: A2 A2 A2 A2 A1 to obtain a board comprising five insulating layers (A) | 49 |
| E3 | one layer of A3 and two layers of A2 are bonded together by a polyurethane-based adhesive filled with inorganic compounds in the following order: A3 A2 A2 to obtain a board comprising three insulating layers (A) | 75 |

TABLE 4

| Example | Composition | Overall Thickness [mm] |
|---|---|---|
| C1 | A*1 | 100 |
| C2 | 5 layers of A*3 and one layer of A*4 are bonded together by water glass glue in the following order: A*3 A*3 A*3 A*3 A*3 A*4 to obtain a board comprising six insulating layers (A*) | 55 |
| C3 | one layer of A*2 and two layers of A*3 are bonded together by water glass glue in the following order: A*2 A*3 A*3 to obtain a board comprising three insulating layers (A) | 80 |

To obtain a thermal insulation system (IS), the inventive thermal insulation boards (IB) according to examples E1 to E3 and the thermal insulation boards according to comparative examples C1 to C3 are affixed on a building wall (BW) by a mortar (fixing layer (X)). The mortar has a thickness of 5 mm, a thermal conductivity λ of 0.540 W/(mK), a density of 1.2 g/cm³ in the dried state and a heat of combustion of 0.5 MJ/kg.

The thermal insulation boards (IB) according to inventive examples E1 and E3, as well as the thermal insulation boards according to comparative examples C2 and C3, are produced before affixing them on the building wall (BW). The thermal insulation board (IB) according to inventive example E2 is produced on site by first affixing a layer A2 on the building wall (BW) by mortar (fixing layer (B)) and then bonding the further three layers A2 and the layer A1 each to the previous layer A2 by mortar.

After affixing the thermal insulation boards on a building wall (BW) by mortar, a mortar with a reinforcing mesh (upper layer (B)) is bonded to the thermal insulation boards according to inventive examples E1 to E3 and to the thermal insulation boards according to comparative examples C1 to C3 such that in the thermal insulation system there is the thermal insulation board between the fixing layer (X) and the upper layer (B). The upper layer (B) has a thickness of 5 mm.

In inventive examples E1 and E2, the upper layer (B) is bonded to the layer A1 and in inventive example E3, the upper layer (B) is bonded to layer A2. In comparative example C1, the upper layer (B) is bonded to layer A*1, in comparative example C2, the upper layer (B) is bonded to layer A*4 and in comparative example C3, the upper layer (B) is bonded to layer A*3.

A finishing layer (C) comprising plaster is bonded to the upper layer (B). The finishing layer (C) has a thickness of 5 mm.

The properties of the thermal insulation systems according to the inventive examples E1 to E3 and of the thermal insulation systems according to the comparative examples C1 to C3 are shown in table 5. The properties of the insulation boards comprised in the thermal insulation systems according to the inventive examples E1 to E3 and in the thermal insulation systems according to the comparative examples C1 to C3 are shown in table 6.

TABLE 5

Properties of the thermal insulation systems comprising thermal insulation boards as well as layers (X), (A), (B) and (C)

| Example | E1 | E2 | E3 | C1 | C2 | C3 |
|---|---|---|---|---|---|---|
| Total thickness [mm] | 60 | 64 | 90 | 115 | 70 | 95 |
| Weight per m$^2$ [kg/m$^2$] | 25 | 30 | 28 | 30 | 30 | 30 |
| Heat of combustion per weight [MJ/kg] | 1.2 | 1.0 | 1.0 | 1.0 | 1.4 | 1.1 |
| Heat of combustion per surface area [MJ/m$^2$] | 30 | 31 | 29 | 29 | 40 | 33 |
| U-Value [m$^2$K/W] | 0.35 | 0.35 | 0.35 | 0.35 | 0.34 | 0.36 |
| R-Value [W/m$^2$K] | 2.8 | 2.8 | 2.8 | 2.9 | 2.9 | 2.8 |
| Perpendicular tensile strength [kPa] | 15 | 15 | 5 | 5 | 8 | 5 |
| Workability, handling, cutting and dust emission | Very good sectility, very low generation of dust | Very good sectility, very low generation of dust | Low generation of dust | Low to moderate generation of dust | moderate generation of dust | moderate generation of dust |

TABLE 6

Properties of the thermal insulation boards

| Example | E1 | E2 | E3 | C1 | C2 | C3 |
|---|---|---|---|---|---|---|
| Total thickness [mm] | 45 | 49 | 75 | 100 | 55 | 80 |
| Weight per m$^2$ [kg/m$^2$] | 7 | 12 | 10 | 12 | 12 | 12 |
| Heat of combustion per weight [MJ/kg] | 2.9 | 1.8 | 2.0 | 1.7 | 2.7 | 2.1 |
| Heat of combustion per surface area [MJ/m$^2$] | 21 | 22 | 20 | 20 | 31 | 24 |
| U-Value [m$^2$K/W] | 0.36 | 0.36 | 0.35 | 0.35 | 0.35 | 0.36 |
| R-Value [W/m$^2$K] | 2.8 | 2.8 | 2.8 | 2.9 | 2.9 | 2.8 |

TABLE 6-continued

Properties of the thermal insulation boards

| Example | E1 | E2 | E3 | C1 | C2 | C3 |
|---|---|---|---|---|---|---|
| Perpendicular tensile strength [kPa] | 15 | 15 | 5 | 5 | 8 | 5 |
| Workability, handling, cutting and dust emission | Very good sectility, very low generation of dust | Very good sectility, very low generation of dust | Low generation of dust | Low to moderate generation of dust | moderate generation of dust | moderate generation of dust |

The specific heat of combustion per surface area and per weight is calculated from the individual components of the system by multiplying the respective MJ/kg value with the weight of the component for each component for a 1 m² surface area.

The U- and R-values can be calculated by referring to Klaus Liersch, Normen Langner, "Bauphysik kompakt", Verlag Bauwerk BBB, 4. Auflage 2011, ISBN 987-3-89932-285-9, Chapter 6 "Wärmedurchgang durch ebene opake Bauteile").

As can be seen from table 6, the inventive thermal insulation boards (IB) according to inventive examples E1 to E3 show a reduced heat of combustion, a reduced total thickness and weight as well as a reduced generation of dust compared to the thermal insulation boards according to comparative examples C1 to C3 while providing a similar overall thermal insulation performance (U-/R-value). In addition, the inventive thermal insulation boards (IB) according to inventive examples E1 to E3 show an increased perpendicular tensile strength compared to the thermal insulation boards according to comparative examples C1 to C3.

The same holds true for the inventive thermal insulation systems: As can be seen from table 5, the inventive thermal insulation systems (IS) according to inventive examples E1 to E3 also show a reduced heat of combustion, a reduced total thickness and weight as well as a reduced generation of dust compared to the thermal insulation systems according to comparative examples C1 to C3 while providing a similar overall thermal insulation performance (U-/R-value). Further, they also show an increased perpendicular tensile strength compared to the thermal insulation systems according to comparative examples C1 to C3.

The inventive thermal insulation systems (IS) can, for example, be used in a multi-layered external thermal insulation composite system (ETICS).

The invention claimed is:

1. A thermal insulation board (IB) comprising at least two insulating layers (A), wherein the at least two insulating layers (A) are bonded together and wherein at least one of the at least two insulating layers (A) comprises at least one aerogel composite material comprising:
   (a1) a plurality of a silica aerogel particles,
   (a2) at least one polymer foam comprising an open-cell polymer foam, and
   (a3) at least one flame retardant embedded in the silica aerogel particles,
   wherein the at least one aerogel composite material comprised in at least one of the at least two insulating layers (A) comprises
   20 to 80% by weight of the silica aerogel (a1),
   1 to 15% by weight of the at least one polymer foam (a2) and
   27 to 60% by weight of the at least one flame retardant (a3),
   based in each case on a total weight of the at least one aerogel composite material and
   wherein the thermal insulation board is characterized by thermal properties that include a furnace temperature rise less than 50° C., a mass loss of less than 50% and a flame time of less than 20 s determined according to ISO 1182:2010,
   wherein the at least one aerogel composite material has a heat of combustion of less than or equal to 3.0 MJ/kg, determined according to EN ISO 1716:2010-11, and has a liquid water uptake of less than or equal to 20% by weight, based on the total weight of the at least one aerogel composite material.

2. The thermal insulation board (IB) according to claim 1, wherein:
   i) the at least two insulating layers (A) are bonded together by at least one first adhesive (AD1), and/or
   ii) the at least two insulating layers (A) are bonded together by mechanical fixing (MF), and/or
   iii) each of the at least two insulating layers (A) has a thickness of 1 to 500 mm.

3. The thermal insulation board (IB) according to claim 2, wherein:
   i) the at least one first adhesive (AD1) is selected from the group consisting of inorganic adhesives, organic adhesives and inorganic-organic hybrid adhesives, the at least one first adhesive (AD1) being a polyurethane-based one- or two-component adhesive with a calorific value of <40 MJ/kg, optionally filled with inorganic compounds, and/or
   ii) the at least one first adhesive (AD1) is applied to at least one surface of at least one of the at least two insulating layers (A), with a thickness of 0.01 to 10 mm, and/or
   iii) the at least one first adhesive (AD1) is applied to at least one surface of at least one of the at least two insulating layers (A) with a weight per square meter of 10 to 500 g/m².

4. The thermal insulation board (IB) according to claim 1, wherein the at least one aerogel composite material comprised in at least one of the at least two insulating layers (A) has:
   i) a density of 0.10 to 0.40 g/cm³, and/or
   ii) a thermal conductivity of less than or equal to 0.030 W/(mK), and/or
   iii) a liquid water uptake of less than or equal to 20% by weight, based on the total weight of the at least one aerogel composite material.

5. The thermal insulation board (IB) according to claim 1, wherein the silica aerogel (a1) comprises in a range from 1 to 25% by weight, of at least one hydrophobic group, based on the total weight of the silica aerogel (a1), wherein the at least one hydrophobic group is bound to at least one silicon atom.

6. The thermal insulation board (IB) according to claim 1, wherein the at least one polymer foam (a2) comprised in the at least one aerogel composite material has a density of 0.002 to 0.025 g/cm$^3$.

7. The thermal insulation board (IB) according to claim 1, wherein the at least one flame retardant (a3) comprised in the at least one aerogel composite material is selected from inorganic compounds, from the group consisting of clay minerals, low melting glasses, metal oxides, metal oxide hydroxides, metal hydroxides, carbonates and hydrocarbonates.

8. The thermal insulation board (IB) according to claim 1, wherein the at least one aerogel composite material further comprises at least one infrared absorbing or reflecting opacifier selected from the group consisting of carbon black, graphite, boron carbide, metal oxides and metal carbides.

9. A thermal insulation system (IS) comprising the thermal insulation board (IB) according to claim 1 and a fixing layer (X), wherein the fixing layer (X) affixes the thermal insulation board (IB) on a building wall (BW).

10. The thermal insulation system (IS) according to claim 9, wherein the fixing layer (X):
  i) comprises at least one second adhesive (AD2) selected from the group consisting of inorganic adhesives and organic adhesives, and/or
  ii) has a thickness of 0.5 to 30 mm.

11. The thermal insulation system (IS) according to claim 9, wherein the thermal insulation system (IS) further comprises an upper layer (B) which is bonded to the thermal insulation board (IB) such that in the thermal insulation system (IS) there is the thermal insulation board (IB) between the fixing layer (X) and the upper layer (B).

12. The thermal insulation system (IS) according to claim 11, wherein the upper layer (B)
  i) comprises at least one third adhesive (AD3) selected from the group consisting of inorganic adhesives and organic adhesives, the at least one third adhesive (AD3) comprising mortar, and optionally at least one reinforcing material selected from the group consisting of meshes, fibers, fleeces and fabrics, and/or
  ii) has a thickness of 0.5 to 30 mm.

13. The thermal insulation system (IS) according to claim 11, wherein the thermal insulation system (IS) further comprises a finishing layer (C) bonded to the upper layer (B), wherein:
  i) the finishing layer (C) comprises plaster or render, and/or
  ii) the finishing layer (C) has a thickness of 0.5 to 40 mm.

14. The thermal insulation system (IS) according to claim 13, wherein the thermal insulation system (IS) further comprises a surface finishing layer (D) bonded to the finishing layer (C), wherein:
  i) the surface finishing layer (D) comprises a coating, a lamination, a film, a foil or a paint, and/or
  ii) the surface finishing layer (D) has a thickness of 0.001 to 10 mm.

* * * * *